United States Patent
Du

(10) Patent No.: US 11,275,922 B2
(45) Date of Patent: Mar. 15, 2022

(54) FINGERPRINT IDENTIFICATION APPARATUS AND ELECTRONIC DEVICE

(71) Applicant: SHENZHEN GOODIX TECHNOLOGY CO., LTD., Shenzhen (CN)

(72) Inventor: Canhong Du, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 182 days.

(21) Appl. No.: 16/697,165

(22) Filed: Nov. 26, 2019

(65) Prior Publication Data
US 2020/0234026 A1    Jul. 23, 2020

Related U.S. Application Data

(63) Continuation of application No. PCT/CN2019/072649, filed on Jan. 22, 2019.

(51) Int. Cl.
*G06K 9/00*      (2006.01)
*G06F 21/32*     (2013.01)

(52) U.S. Cl.
CPC ......... *G06K 9/00033* (2013.01); *G06F 21/32* (2013.01); *G06K 9/0004* (2013.01); *G06K 9/00026* (2013.01)

(58) Field of Classification Search
CPC .................................................. G06K 9/0004
See application file for complete search history.

(56) References Cited

U.S. PATENT DOCUMENTS

| 2017/0185234 A1 | 6/2017 | Zhang |
| 2017/0286743 A1 | 10/2017 | Lee et al. |
| 2019/0012512 A1 | 1/2019 | He et al. |
| 2019/0026523 A1* | 1/2019 | Shen .................... G02B 6/4203 |

FOREIGN PATENT DOCUMENTS

| CN | 104182727 A | 12/2014 |
| CN | 106564023 A | 4/2017 |
| CN | 107358216 A | 11/2017 |

(Continued)

OTHER PUBLICATIONS

Wagner J-M et al.:"3-D image 1-16 reconstruction from exponential X-ray projections using Neumann series", 2001 IEEE International Conference on Acoustics, Speech, and Signal Processing. Proceedings. (ICASSP). Salt Lake City, UT, May 7-11, 2001; [IEEE International Conference on Acoustics, Speech, and Signal Processing (ICASSP)], New York, NY : IEEE, US, vol. 3, May 7, 2001 (May 7, 2001), pp. 2017-2020. DOI: 10.1109/ICASSP.2001.941345 ISBN: 978-0-7803-7041-8.

*Primary Examiner* — Joseph R Haley

(57) ABSTRACT

The embodiments of the present application provide a fingerprint identification apparatus, which has a smaller thickness and a better imaging effect at the same time. The fingerprint identification apparatus includes: a light path directing structure disposed between a display screen and an optical fingerprint sensor for directing a light signal that is obliquely incident on a finger above the display screen at a preset angle and reflected by the finger to the optical fingerprint sensor; and the optical fingerprint sensor disposed below the light path directing structure for detecting the received light signal.

15 Claims, 5 Drawing Sheets

(56) References Cited

FOREIGN PATENT DOCUMENTS

| | | |
|---|---|---|
| CN | 207557977 U | 6/2018 |
| CN | 207851850 U | 9/2018 |
| CN | 108734073 A | 11/2018 |
| CN | 108885693 A | 11/2018 |
| CN | 109074492 A | 12/2018 |
| WO | WO2013071311 A1 | 5/2013 |
| WO | WO2018004243 A1 | 1/2018 |
| WO | 2018188670 A1 | 10/2018 |

\* cited by examiner

FINGERPRINT IDENTIFICATION APPARATUS AND ELECTRONIC DEVICE

This application is a continuation of International Application No. PCT/CN2019/072649, filed on Jan. 22, 2019, the disclosure of which is hereby incorporated by reference in its entirety.

TECHNICAL FIELD

The present application relates to the field of information technology, and in particular, to a fingerprint identification apparatus, and an electronic device.

BACKGROUND

With the wide application of the full screen, mobile terminals have more and more design requirements for under-display fingerprint identification. A traditional capacitive fingerprint identification technology faces limitation in its penetrating ability and is difficult to be applied to an under-display fingerprint identification system. However, an optical fingerprint identification technology breaks the limitation of the display screen and the glass thickness better and thus has a good application prospect.

In an optical fingerprint identification apparatus, a light path directing structure is generally adopted to direct a reflected light signal carrying fingerprint information to an optical fingerprint sensor for collection, and legality of a user identity is confirmed by comparing the collected information with the fingerprint information previously registered and stored. In order to meet requirements for thinness of a terminal device, a thickness of the light path directing structure may be reduced to reduce an overall thickness of the optical fingerprint identification apparatus, but this may affect an imaging effect of the optical fingerprint sensor.

SUMMARY

The embodiments of the present application provide a fingerprint identification apparatus and an electronic device, which have a smaller thickness and a better imaging effect at the same time.

In a first aspect, a fingerprint identification apparatus is provided, including:

a light path directing structure disposed between a display screen and an optical fingerprint sensor for directing a light signal that is obliquely incident on a finger above the display screen at a preset angle and reflected by the finger to the optical fingerprint sensor; and the optical fingerprint sensor disposed below the light path directing structure for detecting the received light signal.

In one possible implementation manner, the light path directing structure includes:

a micro-lens array including a plurality of micro-lenses, where each of the plurality of micro-lenses is configured to converge the received light signal;

at least one light shielding layer disposed below the micro-lens array in sequence, where each light shielding layer includes a plurality of holes respectively corresponding to the plurality of micro-lenses, and holes corresponding to a same micro-lens in the at least one light shielding layer are configured to direct the light signal converged by the same micro-lens to the optical fingerprint sensor in sequence.

In one possible implementation manner, the optical fingerprint sensor includes a plurality of optical sensing units corresponding to the plurality of micro-lenses, where the holes corresponding to the same micro-lens in the at least one light shielding layer are configured to direct the light signal converged by the same micro-lens to an optical sensing unit corresponding to the same micro-lens in sequence.

In one possible implementation manner, apertures of the holes corresponding to the same micro-lens in the at least one light shielding layer are sequentially decrease from a top light shielding layer to a bottom light shielding layer.

In one possible implementation manner, distances between two adjacent light shielding layers are equal.

In one possible implementation manner, lateral shifts between holes corresponding to the same micro-lens in two adjacent light shielding layers are equal.

In one possible implementation manner, the light path directing structure further includes a light transmissive medium configured to be filled between the at least one light shielding layer to connect the at least one light shielding layer.

In one possible implementation manner, the micro-lens array is disposed on an upper surface of the light transmissive medium.

In one possible implementation manner, the light transmissive medium is disposed on an upper surface of the optical fingerprint sensor.

In one possible implementation manner, lenses in the micro-lens array are spherical micro-lenses or aspherical micro-lenses.

In one possible implementation manner, the light path directing structure includes a light pipe array including a plurality of oblique light pipes, where each of the plurality of light pipes is configured to direct the received light signal to the optical fingerprint sensor.

In one possible implementation manner, the optical fingerprint sensor includes a plurality of optical sensing units corresponding to the plurality of light pipes, where each of the plurality of light pipes is configured to direct the received light signal to a corresponding optical sensing unit.

In one possible implementation manner, the light pipe is an optical fiber, or a through hole penetrating an upper surface and a lower surface of the light path directing structure.

In one possible implementation manner, the preset angle is between 5° to 35°, for example 15°.

In a second aspect, an electronic device for fingerprint identification is provided, including a display screen, and the fingerprint identification apparatus in the first aspect and any possible implementation of the first aspect.

In one possible implementation manner, the display screen is an organic light-emitting diode OLED display screen or liquid crystal display LCD display screen.

Based on the above technical solution, the light path directing structure in the fingerprint identification apparatus is capable of directing a light that is obliquely incident on a finger at a preset angle and reflected by the finger to the optical fingerprint sensor. Since the light path directing structure adopts an oblique light path and a reflection intensity of the obliquely incident light is higher than that of the vertically incident light, the imaging contrast ratio of the optical fingerprint sensor is improved and the thickness of the fingerprint identification apparatus is greatly reduced.

DESCRIPTION OF EMBODIMENTS

The technical solutions in embodiments of the present application will be described hereinafter in conjunction with the accompanying drawings.

It should be understood that embodiments of the present application may be applied to an optical fingerprint system, including but not limited to an optical fingerprint identification system and a medical diagnostic product based on optical fingerprint imaging. The embodiments of the present application are only described by taking the optical fingerprint system as an example, which should not constitute any limitation to the embodiments of the present application, and the embodiments of the present application are also applicable to other systems using an optical imaging technology or the like.

As a common application scenario, the optical fingerprint system provided in the embodiments of the present application may be applied to a smart phone, a tablet computer, and other mobile terminals having a display screen or other terminal devices. More specifically, in the foregoing terminal device, a fingerprint identification apparatus may be specifically an optical fingerprint apparatus, which may be disposed in a partial region or an entire region under a display screen, thereby forming an Under-display optical fingerprint system. Alternatively, the fingerprint identification apparatus may also be partially or entirely integrated into the interior of the display screen of the terminal device to form an In-display optical fingerprint system.

Figure 1:
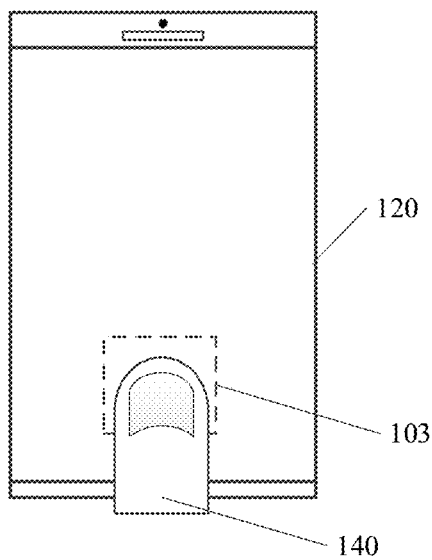
FIG. 1 is a structural schematic diagram of an electronic device to which the present application is applicable.
Figure 1:
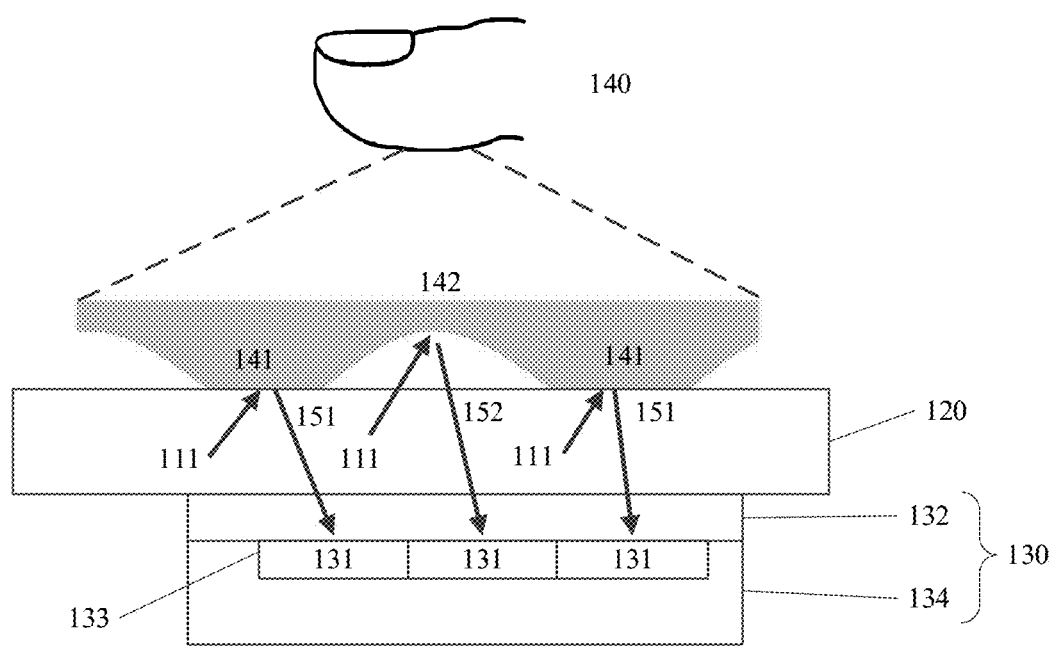

FIG. 1 is a structural schematic diagram of a terminal device applicable to an embodiment of the present application. The terminal device 10 includes a display screen 120 and an optical fingerprint apparatus 130, where the optical fingerprint apparatus 130 is disposed in a partial region below the display screen 120. The optical fingerprint apparatus 130 includes an optical fingerprint sensor including a sensing array 133 having a plurality of optical sensing units 131. A region where the sensing array 133 is located or a sensing region of the sensing array 133 is a fingerprint detecting region 103 of the optical fingerprint apparatus 130. As shown in FIG. 1, the fingerprint detecting region 103 is located within a display region of the display screen 120. In an alternative embodiment, the optical fingerprint apparatus 130 may also be disposed at other positions, such as a side of the display screen 120 or an edge non-light transmissive region of the terminal device 10, and a light signal of at least part of the display region of the display screen 120 is directed to the optical fingerprint apparatus 130 through a light path design, such that the fingerprint detecting region 103 is actually located in the display region of the display screen 120.

It should be understood that an area of the fingerprint detecting region 103 may be different from an area of the sensing array 133 of the optical fingerprint apparatus 130. For example, the area of the fingerprint detecting region 103 of the optical fingerprint apparatus 130 may be larger than the area of the sensing array 133 of the optical fingerprint apparatus 130 through for example, a lens imaging light path design, a reflective folding light path design or other light path designs such as light convergence or reflection. In other alternative implementation manners, if the light path is directed in a manner of, for example, light collimation, the area of the fingerprint detecting region 103 of the optical fingerprint apparatus 130 may also be designed to be substantially identical with the area of the sensing array 133 of the optical fingerprint apparatus 130.

Therefore, when a user needs to unlock the terminal device or perform other fingerprint verification, a fingerprint input may be implemented merely by pressing a finger against the fingerprint detecting region 103 located on the display screen 120. Since fingerprint detection may be implemented in the display, there is no need to exclusively reserve space for a front surface of the terminal device 10 adopting the foregoing structure to set a fingerprint button (such as a Home button), so that a full screen solution may be adopted; that is, the display region of the display screen 120 may be basically extended to an entire front surface of the terminal device 10.

As an optional implementation manner, as shown in FIG. 1, the optical fingerprint apparatus 130 includes a light detecting portion 134 and an optical component 132. The light detecting portion 134 includes the sensing array 133, and a readout circuit and other auxiliary circuits electrically connected to the sensing array 133, and may be fabricated on a die by a semiconductor process, such as on an optical imaging chip or an optical fingerprint sensor. The sensing array 133 specifically is a photo detector array including a plurality of photo detectors distributed in an array, and the photo detectors may serve as the optical sensing units as described above. The optical component 132 may be disposed above the sensing array 133 of the light detecting portion 134, and may specifically include a filter layer, a light directing layer or light path directing structure, and other optical elements. The filter layer may be used to filter ambient light passing through a finger, and the light directing layer or light path directing structure is mainly used to direct reflected light reflected from a finger surface to the sensing array 133 for optical detection.

In specific implementation, the optical component 132 and the light detecting portion 134 may be encapsulated in the same optical fingerprint component. For example, the optical component 132 and the optical detecting portion 134 may be encapsulated in the same optical fingerprint chip, or the optical component 132 may be disposed outside the chip where the optical detecting portion 134 is located, for example the optical component 132 is attached above the chip, or some elements of the optical component 132 are integrated into the foregoing chip.

There are various implementation schemes for the light directing layer or light path directing structure of the optical component 132, for example, the light directing layer may be specifically a collimator layer made on a semiconductor silicon wafer, which has a plurality of collimating units or micro-pore arrays, and the collimating units may be holes. Light in the reflected light reflected from the finger that is vertically incident to the collimating unit may pass through the collimating unit and be received by the optical sensing unit below it. However, light with an excessive large incident angle is attenuated through multiple reflection inside the collimating unit, and therefore, each optical sensing unit may basically only receive the reflected light reflected from a fingerprint pattern right above the optical sensing unit, and thus the sensing array 133 may detect a fingerprint image of the finger.

In another embodiment, the light directing layer or the light path directing structure may also be an optical lens layer having one or more lens units, for example, a lens group composed of one or more aspheric lenses, for converging reflected light reflected from the finger to the sensing array 133 of the light detecting portion 134 below it, so that the sensing array 133 may perform imaging based on the reflected light so as to obtain the fingerprint image of the finger. Optionally, the optical lens layer may further be formed with pinholes in the light path of the lens unit, and the pinholes may cooperate with the optical lens layer to expand the field of view of the optical fingerprint apparatus 130, to improve a fingerprint imaging effect of the optical fingerprint apparatus 130.

In other embodiments, the light directing layer or the light path directing structure may also specifically adopt a micro-lens layer having a micro-lens array composed of a plurality of micro-lenses, which may be formed above the sensing array 133 of the light detecting portion 134 by a semiconductor growth process or other processes, and each micro-lens may correspond to one of the sensing units in the sensing array 133 respectively. Moreover, other optical film layers such as a medium layer or a passivation layer, may be formed between the micro-lens layer and the sensing unit. More specifically, a light shielding layer having micro-pores may further be included between the micro-lens layer and the sensing unit, where the micro-pores are formed between corresponding micro-lens and sensing units, and the light shielding layer may block optical interference between adjacent micro-lenses and the sensing units, such that light corresponding to the sensing unit is converged to the interior of the micro-pore through the micro-lens and is transmitted to the sensing unit via the micro-pore to perform optical fingerprint imaging.

It should be understood that several implementations of the foregoing light directing layer or the light path directing structure may be used alone or in combination. For example, a micro-lens layer may be further disposed above or below a collimator layer or an optical lens layer. Certainly, when the collimator layer or the optical lens layer is used in combination with the micro-lens layer, the specific laminated structure or light path may require to be adjusted according to actual needs.

As an optional embodiment, the display screen 120 may adopt a display screen having a self-emitting display unit, for example, an organic light-emitting diode (OLED) display screen or a micro light-emitting diode (Micro-LED) display screen. Taking an OLED display screen as an example, the optical fingerprint apparatus 130 may use a display unit (that is, an OLED light source) located at the fingerprint detecting region 103 of the OLED display screen 120 as an excitation light source for optical fingerprint detection. When a finger 140 is pressed against the fingerprint detecting region 103, the display screen 120 emits a beam of light 111 to a target finger 140 above the fingerprint detecting region 103, and the light 111 is reflected by a surface of the finger 140 to form reflected light or form scattered light after scattering inside the finger 140. In related patent applications, the reflected light and the scattered light are referred to as reflected light for convenience of description. Since a ridge and a valley of a fingerprint have different light reflecting capabilities, reflected light 151 from the ridge of the fingerprint and the reflected light 152 from the valley of the fingerprint have different light intensities. After passing through the optical component 132, the reflected light is received by the sensing array 133 in the optical fingerprint apparatus 130 and converted into corresponding electrical signal, that is, a fingerprint detecting signal; and fingerprint image data may be obtained based on the fingerprint detecting signal, and fingerprint matching verification may be further performed, thereby implementing an optical fingerprint identification function at the terminal device 10.

In other embodiments, the optical fingerprint apparatus 130 may also use an internal light source or an external light source to provide a light signal for fingerprint detection. In this case, the optical fingerprint apparatus 130 may be applied to a non-self-emitting display screen, such as a liquid crystal display screen or other passive light-emitting display screens. Taking a liquid crystal display screen having a backlight module and a liquid crystal panel as an example, in order to support under-display fingerprint detection of the liquid crystal display screen, the optical fingerprint system of the terminal device 10 may further include an excitation light source for optical fingerprint detection. The excitation light source may specifically be an infrared light source or a light source of non-visible light with a specific wavelength, which may be disposed under the backlight module of the liquid crystal display screen or disposed in an edge region under a protective cover of the terminal device 10. The optical fingerprint apparatus 130 may be disposed under the liquid crystal panel or the edge region of the protective cover, and light for fingerprint detection may reach the optical fingerprint apparatus 130 by being directed by a light path. Alternatively, the optical fingerprint apparatus 130 may also be disposed under the backlight module, and the backlight module allows the light for fingerprint detection to pass through the liquid crystal panel and the backlight module and reach the optical fingerprint apparatus 130 by providing a hole on film layers such as a diffusion sheet, a brightening sheet, a reflection sheet or the like, or by performing other optical designs. When the optical fingerprint apparatus 130 uses an internal light source or an external light source to provide a light signal for fingerprint detection, a detection principle is consistent with the foregoing description.

It should be understood that, in specific implementation, the terminal device 10 further includes a transparent protective cover; the cover may be a glass cover or a sapphire cover, which is located above the display screen 120 and covers a front surface of the terminal device 10. Therefore, in an embodiment of the present application, the so-called the finger being pressed against the display screen 120 actually refers to the finger being pressed against the cover 110 above the display screen 120 or a surface of the protective layer covering the cover 110.

On the other hand, in some embodiments, the optical fingerprint apparatus 130 may only include one optical fingerprint sensor, and in this case, the fingerprint detecting region 103 of the optical fingerprint apparatus 130 has a smaller area and a fixed position, and therefore, the user needs to press the finger at a specific position of the fingerprint detecting region 103 when a fingerprint input is performed, otherwise the optical fingerprint apparatus 130 may not be able to capture the fingerprint image, thereby resulting in a poor user experience. In other alternative embodiments, the optical fingerprint apparatus 130 may specifically include a plurality of optical fingerprint sensors which may be disposed under the display screen 120 side by side in a splicing manner, and sensing regions of the plurality of optical fingerprint sensors collectively constitute the fingerprint detecting region 103 of the optical fingerprint apparatus 130. In other words, the fingerprint detecting region 103 of the optical fingerprint apparatus 130 may include a plurality of sub-regions, each sub-region corresponding to a sensing region of one of the optical fingerprint sensors, so that a fingerprint capturing region 103 of the optical fingerprint module 130 may be extended to a main region of a lower portion of the display screen, that is, it is extended to a generally pressed region by the finger to achieve a blind pressing type of a fingerprint input operation. Alternatively, when the number of the optical fingerprint sensors is sufficient, the fingerprint detecting region 130 may also be extended to a half of the display region or even the entire display region, thereby achieving half-screen or full-screen fingerprint detection.

In order to reduce the thickness of the fingerprint identification apparatus, it is generally possible to reduce the thickness of the light path directing structure, for example to reduce the thickness of the collimator having an array of collimating holes, that is, to reduce the value of "hole depth/aperture" of the collimating holes in the collimator. However, as the "hole depth/aperture" decreases, a light receiving angle of the collimating holes becomes larger and the collimation degree lower, thereby affecting the imaging effect of the optical fingerprint sensing.

To this end, the embodiments of the present application provide a fingerprint identification apparatus, which has a smaller thickness and a better imaging effect at the same time.

Figure 2:
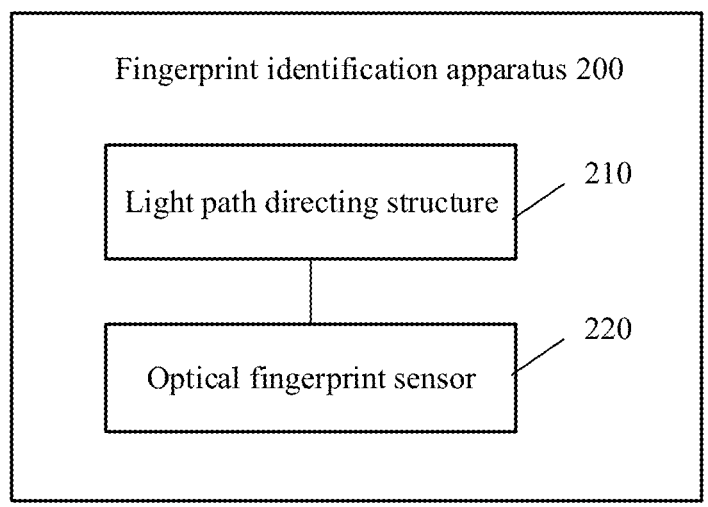
FIG. 2 is a schematic block diagram of a fingerprint identification apparatus of an embodiment of the present application.

FIG. 2 shows a schematic diagram of a fingerprint identification apparatus according to an embodiment of the present application. As shown in FIG. 2, the fingerprint identification apparatus 200 can be applied in an electronic device having a display screen. The fingerprint identification apparatus 200 includes a light path directing structure (or referred to as a light directing layer, a light path modulating structure, and the like) 210 and an optical fingerprint sensor 220.

The light path directing structure 210 is disposed between the display screen and the optical fingerprint sensor 220 for directing a light signal that is obliquely incident on a finger above the display screen at a preset angle i and reflected by the finger to the optical fingerprint sensor 220.

The optical fingerprint sensor 220 is disposed below the light path directing structure 210 for detecting the received light signal.

The preset angle i is greater than 0°, for example, 5°<i<35°. When light incident at the angle i is reflected by the finger, a reflected angle of the reflected light is equal to i. The reflected light is refracted through the lower surface of the display screen and/or the upper surface of the light path directing structure, and finally enters the light path directing structure 210 obliquely.

Since the oblique light path is adopted, the light path directing structure 210 is capable of directing a light that is obliquely incident on a finger at a preset angle and reflected by the finger to the optical fingerprint sensor 220. Since the reflection intensity of the obliquely incident light is higher than that of the vertically incident light, the imaging contrast ratio of the optical fingerprint sensor 220 is improved and the thickness of the fingerprint identification apparatus is greatly reduced.

The embodiments of the present application provide two types of light path directing structures 210, which is capable of directing oblique light. The descriptions are provided hereinafter separately.

Type 1

The light path directing structure 210 includes a micro-lens array and at least one light shielding layer.

The micro-lens array includes a plurality of micro-lenses, where each of the plurality of micro-lenses is configured to converge a received light signal.

The at least one light shielding layer is disposed below the micro-lens array in sequence, where each light shielding layer includes a plurality of holes respectively corresponding to the plurality of micro-lenses, and at least one hole corresponding to a same micro-lens in the at least one light shielding layer is configured to direct the light signal converged by the same micro-lens to the optical fingerprint sensor 220 in sequence.

The plurality of micro-lenses in the micro-lens array may be, for example, spherical micro-lenses or aspherical micro-lenses, or the plurality of micro-lenses may include both spherical lenses and aspherical lenses, as long as light convergence can be achieved. Moreover, the micro-lens can be replaced by a lens.

The optical fingerprint sensor 220 is configured to detect an incident light satisfying a preset angle i, and only when the incident light satisfying the preset angle i is incident on a finger above the display screen and reflected by the finger, can it be directed to the optical fingerprint sensor 220 by the light path directing structure 210, while light incident at other angles cannot reach the optical fingerprint sensor 220.

In the process of fingerprint identification, when the finger is presses against the fingerprint collection region in the display screen, a ridge of the finger contacts the screen, while between a valley of the finger and the screen there is an air gap, so that intensities of the light reflected by the ridge and the valley are different. With the air gap between the valley and the screen, a glass-air interface is formed, which reflects more light. Therefore, after received by the optical fingerprint sensor 220, the light reflected by the valley is imaged as a "bright line", while the light reflected by the ridge is imaged as a "dark line".

A collimator having an array of collimating holes can only receive light reflected vertically by the finger. However, in the embodiments of the present application, the light path directing structure 210 adopts the oblique light path, so that only the light that is incident on the finger at the preset angle i and reflected by the finger can reach the optical fingerprint sensor 220. Since the reflected intensity of the obliquely incident light is greater than that of the vertically incident light, the contrast ratio is higher between the "bright line" and the "dark line" imaged by the optical fingerprint sensor 220 according to the collected oblique light signal, which means the imaging effect of the optical fingerprint sensor 220 is better.

In addition to directing light path, the holes in each of the light shielding layers of the light path directing structure 210 can effectively prevent light crosstalk and block stray light, so that only the light satisfying the foregoing preset angle i can reach the optical fingerprint sensor 220 through the light path directing structure 210.

The number of the at least one light shielding layer is not limited in the embodiments of the present application. Too many of the light shielding layers may increase the thickness and complexity of the light path directing structure 210, while too little of the light shielding layers may bring more interference light and affect the imaging effect. In actual use, a reasonable number of light shielding layers can be set according to requirements.

Since the light obliquely incident on the finger is still oblique after being reflected, in order to direct the reflected oblique light, the light path directing structure 210 adopts an oblique light path, and therefore, the holes corresponding to the same micro-lens in different light shielding layers have a lateral shift between each other.

That is to say, the holes corresponding to the same micro-lens in at least one of the light shielding layers of the light path directing structure 210 are sequentially located from top to bottom on the light path of the oblique light converged by the micro-lenses.

The lateral shifts of the holes between two adjacent light shielding layers corresponding to the same lens are equal or unequal.

Moreover, distances between two adjacent light shielding layers are equal or unequal.

For example, when the distances between the two adjacent light shielding layers are equal, the lateral shifts of the holes between the two adjacent light shielding layers corresponding to the same lens are equal.

Optionally, the optical fingerprint sensor 220 includes an optical sensing unit (or referred to as light sensing pixel) array, and a plurality of optical sensing units in the optical sensing unit array correspond to a plurality of micro-lenses in the micro-lens array. The holes corresponding to the same micro-lens in the at least one light shielding layers is configured to direct the light signal converged by the same micro-lens to the optical sensing unit corresponding to the same micro-lens in sequence.

The plurality of micro-lenses may have a one-to-one correspondence with the plurality of optical sensing units, or one micro-lens corresponds to a plurality of optical sensing units, or one optical sensing unit corresponds to a plurality of micro-lenses, which are not limited herein.

Optionally, apertures of the holes corresponding to the same micro-lens in the at least one light shielding layer decreases from a top light shielding layer to a bottom light shielding layer.

Since the micro-lens is configured to converge the light it receives, the width of the light converged by the micro-lens gradually decreases from a top light shielding layer to a bottom light shielding layer. Therefore, by setting the apertures of the holes in the different light shielding layers corresponding to the micro-lens to sequentially decrease from a top light shielding layer to a bottom light shielding layer, the light reaching the optical fingerprint sensor 220 can become a narrow beam, thereby realizing reception of the light by the optical fingerprint sensor 220 at a narrow angle and improving the imaging sharpness of the optical fingerprint sensor 220.

Optionally, the light path directing structure 210 further includes a light transmissive medium configured to be filled between the at least one light shielding layer to connect the at least one light shielding layer.

Certainly, the at least one light shielding layer in the light path directing structure 210 can be connected and fixed by other means, for example, by a bracket or the like, which is not limited by the embodiments of the present application.

Optionally, the micro-lens array is disposed on an upper surface of the light transmissive medium.

Optionally, the light path directing structure 210 is disposed on an upper surface of the optical fingerprint sensor 220.

It should be understood that the light path directing structure 210 in the embodiments of the present application may be encapsulated together with the optical fingerprint sensor 220. For example, the light path directing structure 210 may be disposed on the upper surface of the optical fingerprint sensor 220, that is, the upper surface of the optical sensing array, by means of gluing or the like; or the light path directing structure 210 may also be disposed above the optical fingerprint sensor 220 as a relatively separate component with respect to the optical fingerprint sensor 220.

Figure 3:
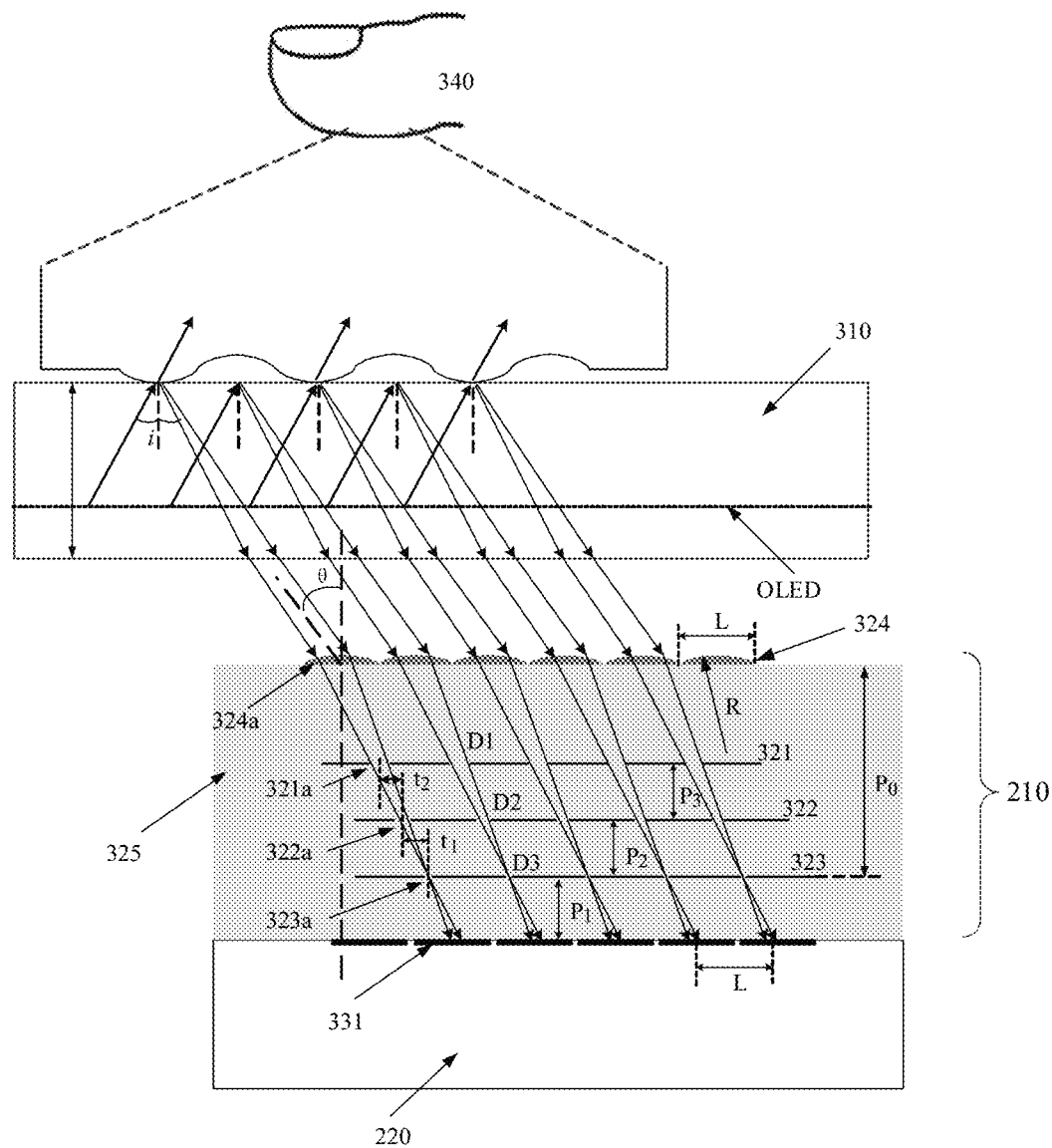
FIG. 3 is a structural schematic diagram of a fingerprint identification apparatus according to an embodiment of the present application.

The fingerprint identification apparatus of the embodiments of the present application will be specifically described below by taking FIG. 3 as an example. FIG. 3 shows a possible structure of a fingerprint identification apparatus according to an embodiment of the present application. The light path directing structure 210 shown in FIG. 3 includes a lens array 324 and three light shielding layers (LS). The micro-lens array 324 is located at a specific location below the display screen 310 for converging reflected light from a finger 340 on the display screen 310. The three light shielding layers are sequentially located below the lens array 324 for directing light converged by the micro-lens array 324 to the optical fingerprint sensor 220. The three light shielding layers are, in order from top to bottom, light shielding layer 321, light shielding layer 322 and light shielding layer 323. The three light shielding layers are filled with a light transmissive medium 325 therebetween.

The light shielding layer 321 the light shielding layer 322, and the light shielding layer 323 are punched with holes in arrays at specified positions. The holes corresponding to the micro-lens 324a include hole 321a on the light shielding layer 321, hole 322a in the light shielding layer 322, and hole 323a in the light shielding layer 323. The distance between the micro-lens 324 array and the light shielding layer 323 is $P_0$, and the distance between the light shielding layer 323 and the optical sensing unit 331 of the optical fingerprint sensor 220 is P1. The micro-lens array 324 is disposed on an upper surface of the filling medium 325, and the micro-lenses in the micro-lens array 324 are convex lenses having a spherical radius R. A chord length L of the micro-lens formed on the upper surface of the light transmissive medium is equal to a spacing L between adjacent optical sensing units 331 of the optical fingerprint sensor 220. Each optical sensing unit corresponding to one micro-lens is taken as an example herein. The light signal converged by each micro-lens is directed to a corresponding optical sensing unit by holes corresponding to the micro-lens in sequence.

The working process of the light path directing structure will be described by taking the micro-lens 324a and its corresponding holes as an example. The light incident at the preset angle i is reflected by the finger 340 and finally reaches the optical fingerprint sensor 220 via the light path directing structure. Specifically, when the light satisfying the preset angle i is incident on the finger 340 above the display screen 310 and reflected by the finger 340, the reflected light having a reflection angle equal to i is obtained, which is refracted on the lower surface of the display screen 310 and incident at an angle θ into the micro-lens 324a. The micro-lens 324a converges the received light and the converged light passes through the hole 321a on the light shielding layer 321, the hole 322a on the light shielding layer 322, and the hole 323a on the light shielding layer 323 to reach the optical sensing unit 331 corresponding to the micro-lens 324a on the optical fingerprint sensor 220.

The aperture of the hole 321a on the light shielding layer 321 is D1, the aperture of the hole 322a in the light shielding layer 322 is D2, and the aperture of the hole 323a in the light shielding layer 323 is D3. Since D1>D2>D3, the light captured by the optical fingerprint sensor 220 is a narrow angle light, and the light shielding layer 321, the light shielding layer 322 and the light shielding layer 323 can respectively block crosstalk lights nearby the hole 321a, the hole 322a and the hole 323a, thus improving the imaging effect of the optical fingerprint sensor 200.

A distance between the light shielding layer 321 and the light shielding layer 322 is P3, a distance between the light shielding layer 322 and the light shielding layer 323 is P2, and a distance between the light shielding layer 323 and the optical sensing unit 331 is P1. A lateral shift between the hole 321a on the light shielding layer 321 and the hole 322a in the light shielding layer 322 is t2, and a lateral shift between the hole 322a on the light shielding layer 322 and the hole 323a in the light shielding layer 323 is t1. When P1=P2=P3, t1=t2.

It can be seen that, on the one hand, the light path directing structure can direct the light signal incident on the finger 340 at a preset angle i and reflected by the finger 340 to the optical fingerprint sensor 220, thus increasing the intensity of the light signal received by the optical fingerprint sensor 220 and improving the imaging effect of the optical fingerprint sensor 220.

On the other hand, considering that the optical sensing unit 331 of the optical fingerprint sensor 220 usually has only a size of 5 μm to 25 μm, the $P_0$ is usually set to be three times a shift between adjacent optical sensing units 331, and a spherical radius R of the micro-lens may be equal to the spacing between adjacent optical sensing units 331. Thus, the thickness of the light path directing structure can be thin enough, substantially less than 100 μm, and therefore, the thickness of the fingerprint identification apparatus can be effectively reduced.

In contrast, a collimator with an array of collimating holes is typically thicker than 200 μm, and the distance between the collimator and the optical fingerprint sensor 220 shall meet a requirement of 500 μm to meet the imaging requirements of the collimator, so that a thickness of the fingerprint identification apparatus is large.

Type 2

The light path directing structure 210 includes a light pipe array which includes a plurality of oblique light pipes 211, where each of the plurality of light pipes 211 is configured to direct a received light signal to an optical fingerprint sensor 220.

Figure 4:
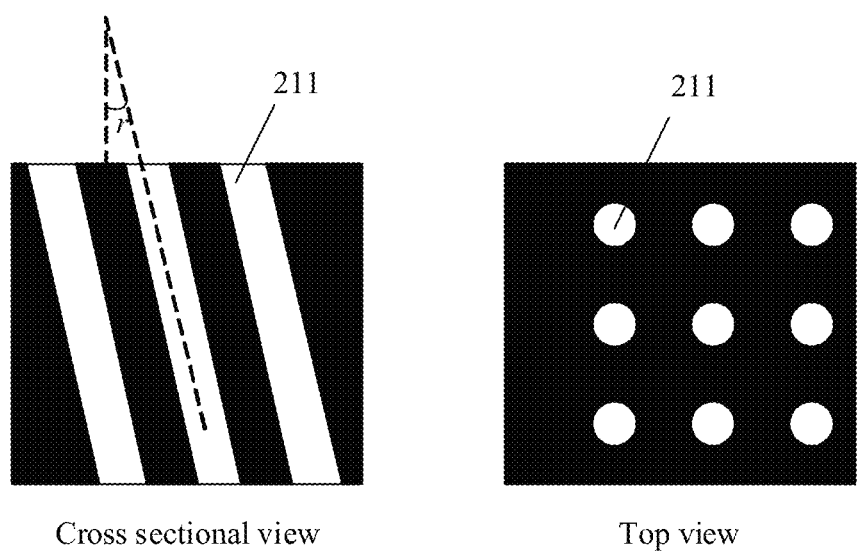
FIG. 4 is a schematic diagram of a light path directing structure according to an embodiment of the present application.

As shown in FIG. 4, the light path directing structure 210 includes a plurality of light pipes 211, and an angle r between an axial direction of each of the plurality of light pipes 211 and a normal direction perpendicular to a surface of the light path directing structure 210 is greater than 0°. For convenience of description, the angle r is referred to as the oblique angle of the light pipe hereafter.

Optionally, the optical fingerprint sensor 220 includes a plurality of optical sensing units corresponding to the plurality of light pipes 211, where each of the plurality of light pipes 211 is configured to direct the received light signal to a corresponding optical sensing unit.

The light incident on the finger at a preset angle i is reflected by the finger and enters the light path directing structure 210. The light path directing structure 210 directs the light so that the reflected light passing through each of the light pipe 211 of the light path directing structure 210 is obliquely incident on optical sensing units of the optical fingerprint sensor at the angle r.

A cross section of the light pipes 211 of the light path directing structure 210 may be, for example, circular, elliptical, square or any other shape.

Optionally, light pipes 211 in the light pipe array are optical fibers, or through holes penetrating an upper surface and a lower surface of the light path directing structure 210.

A material of a non-light directing region of the light path directing structure 210 is opaque to a wavelength band used by the fingerprint identification apparatus 200; for example, the material may be silicon, carbide of silicon, oxide of silicon, nitride or the like.

The light path directing structure 210 may be encapsulated together with the optical fingerprint sensor 220, for example, the light path directing structure 210 is in close contact with the upper surface of the optical fingerprint sensor 220, or is present as a separate component in the fingerprint identification apparatus 200. There may be a certain distance or no distance between the light path directing structure 210 and the display screen.

Figure 5:
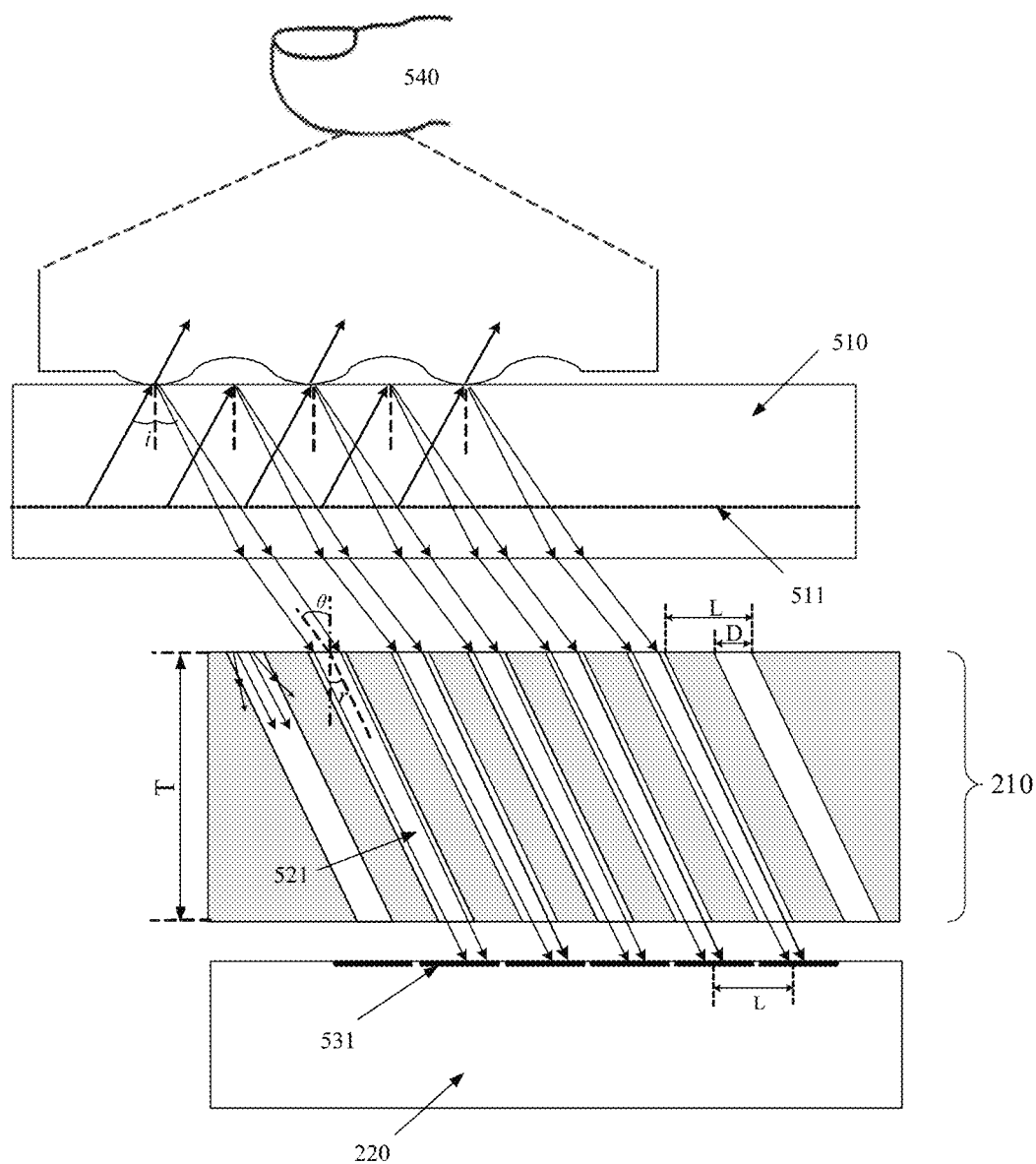
FIG. 5 is a structural schematic diagram of a fingerprint identification apparatus according to an embodiment of the present application.

The fingerprint identification apparatus of the embodiments of the present application will be specifically described below by taking FIG. 5 as an example. FIG. 5 shows a possible structure of a fingerprint identification apparatus according to an embodiment of the present application. The light path directing structure 210 shown in FIG. 5 includes a light pipe array. The diameter of the light pipes is D, which may be, for example, 15 μm. The thickness of the light path directing structure 210 is T, which is typically less than 200 μm. A spacing L between two adjacent light pipes is equal to a spacing L between adjacent optical sensing units 531 of the optical fingerprint sensor 220, for example, the L may be 15 μm. In an example where one light pipe corresponds to one optical sensing unit 531, each light pipe is configured to direct the oblique light signal to a corresponding optical sensing unit 531.

The working process of the light path directing structure 210 will be described by taking the light pipe 521 as an example. A light incident on a finger 540 at the preset angle i is reflected by the finger 540 and finally reaches the optical fingerprint sensor 220 via the light path directing structure 210. Specifically, a light satisfying the preset angle i is incident on the finger 540 above the display screen 510 and reflected by the finger 540. The reflected light having a reflection angle equal to i is obtained, which is refracted on the lower surface of the display screen 510 and the upper surface of the light pipe, and finally enters the light pipe 521 at an angle r. The light pipe 521 directs the received light to the optical sensing unit 531 corresponding to the light pipe 521.

It can be seen that the light path directing structure 210 has a light pipe array composed of oblique light pipes, and the light path directing structure 210 can be made to have a smaller thickness in the case of using light pipes of a same length. In other words, in a case of a same length-width ratio, a thinner thickness of the light path directing structure 210 can be obtained. Moreover, a propagation path and angle of a light can be effectively changed by adjusting an oblique angle of the light pipes in the light path directing structure 210 to make a modulation of the light path more flexible.

On the other hand, the light path directing structure 210 in the embodiments of the present application can prevent the light signal reflected back from the surface of the finger 540 from being directly and perpendicularly incident to the optical fingerprint sensor 220, suppress effectively a noise during a transmission of the foregoing light, and improve a signal-to-noise ratio of the fingerprint detection apparatus, thereby effectively improving a fingerprint imaging effect.

An embodiment of the present application further provides an electronic device, and the electronic device may include a display screen and the fingerprint identification apparatus in the foregoing various embodiments of the present application.

Optionally, the display screen may be the display screen described above, such as an LCD screen or an OLED display screen. When the display screen is an OLED display screen, a light-emitting layer of the display screen includes a plurality of organic light-emitting diode light sources, where the fingerprint identification apparatus adopts at least a part of the organic light-emitting diode light sources as an excitation source for fingerprint identification.

By way of example and not limitation, the electronic device may be a portable or mobile computing device, such as a terminal equipment, a phone, a tablet computer, a notebook computer, a desktop computer, a game device, an in-vehicle electronic device, or a wearable smart device, and other electronic devices such as an electronic database, an automobile and an automated teller machine (ATM). The wearable smart device is full-featured and large-sized and can realize complete or partial functions without relying on a smart phone, such as a smart watch or smart glasses, and only focuses on a certain type of application function, and shall be used in cooperation with such other device as a smart phone, such as various types of smart bracelets, smart jewelry and other devices for physical sign monitoring.

It should be understood that the specific examples in the embodiments of the present application are only to help those skilled in the art to better understand the embodiments of the present application, but not to limit the scope of the embodiments of the present application. Various modifications and variations which fall within the scope of the present application can be made by those skilled in the art based on the foregoing embodiments.

The foregoing descriptions are merely specific implementation manners of the present application. However, the protection scope of the present application is not limited thereto, and those skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A fingerprint identification apparatus, comprising:
a light path directing structure disposed between a display screen and an optical fingerprint sensor for directing a light signal that is obliquely incident on a finger above the display screen at a preset angle and reflected by the finger to the optical fingerprint sensor, the preset angle is between 5° to 35°; and
the optical fingerprint sensor disposed below the light path directing structure for detecting the received light signal;
wherein the light path directing structure comprises:
a micro-lens array comprising a plurality of micro-lenses, wherein each of the plurality of micro-lenses is configured to converge the received light signal;
a plurality of light shielding layers disposed below the micro-lens array in sequence, wherein each light shielding layer comprises a plurality of holes respectively corresponding to the plurality of micro-lenses, and holes corresponding to a same micro-lens in the at least one light shielding layer are configured to direct the light signal converged by the same micro-lens to the optical fingerprint sensor in sequence;
each of the plurality of micro-lenses is configured to converge the received light signal to a hole in the bottommost light shielding layer of the plurality of light-blocking layers, and the focal plane of each of the plurality of micro-lenses is located on the plane where the bottommost light shielding layer is located.

2. The fingerprint identification apparatus according to claim 1, wherein the optical fingerprint sensor comprises a plurality of optical sensing units corresponding to the plurality of micro-lenses, wherein the holes corresponding to the same micro-lens in the at least one light shielding layer are configured to direct the light signal converged by the same micro-lens to an optical sensing unit corresponding to the same micro-lens in sequence.

3. The fingerprint identification apparatus according to claim 1, wherein apertures of the holes corresponding to the same micro-lens in the at least one light shielding layer are sequentially decrease from a top light shielding layer to a bottom light shielding layer.

4. The fingerprint identification apparatus according to claim 1, wherein distances between two adjacent light shielding layers are equal.

5. The fingerprint identification apparatus according to claim 1, wherein lateral shifts between holes corresponding to the same micro-lens in two adjacent light shielding layers are equal.

6. The fingerprint identification apparatus according to claim 1, wherein the light path directing structure further comprises a light transmissive medium configured to be filled between the at least one light shielding layer to connect the at least one light shielding layer.

7. The fingerprint identification apparatus according to claim 6, wherein the micro-lens array is disposed on an upper surface of the light transmissive medium.

8. The fingerprint identification apparatus according to claim 6, wherein the light transmissive medium is disposed on an upper surface of the optical fingerprint sensor.

9. The fingerprint identification apparatus according to claim 1, wherein lenses in the micro-lens array are spherical micro-lenses or aspherical micro-lenses.

10. An electronic device, comprising a display screen and a fingerprint identification apparatus, wherein the fingerprint identification apparatus comprises:
a light path directing structure disposed between a display screen and an optical fingerprint sensor for directing a light signal that is obliquely incident on a finger above the display screen at a preset angle and reflected by the finger to the optical fingerprint sensor, the preset angle is between 5° to 35°; and
the optical fingerprint sensor disposed below the light path directing structure for detecting the received light signal;
wherein the light path directing structure comprises:
a micro-lens array comprising a plurality of micro-lenses, wherein each of the plurality of micro-lenses is configured to converge the received light signal;
a plurality of light shielding layers disposed below the micro-lens array in sequence, wherein each light shielding layer comprises a plurality of holes respectively corresponding to the plurality of micro-lenses, and holes corresponding to a same micro-lens in the at least one light shielding layer are configured to direct the light signal converged by the same micro-lens to the optical fingerprint sensor in sequence;
each of the plurality of micro-lenses is configured to converge the received light signal to a hole in the bottommost light shielding layer of the plurality of light-blocking layers, and the focal plane of each of the plurality of micro-lenses is located on the plane where the bottommost light shielding layer is located.

11. The electronic device according to claim 10, wherein the optical fingerprint sensor comprises a plurality of optical sensing units corresponding to the plurality of micro-lenses, wherein the holes corresponding to the same micro-lens in the at least one light shielding layer are configured to direct the light signal converged by the same micro-lens to an optical sensing unit corresponding to the same micro-lens in sequence.

12. The electronic device according to claim 10, wherein apertures of the holes corresponding to the same micro-lens in the at least one light shielding layer are sequentially decrease from a top light shielding layer to a bottom light shielding layer.

13. The electronic device according to claim 10, wherein distances between two adjacent light shielding layers are equal.

14. The fingerprint identification apparatus according to claim 1, wherein a distance between the micro-lens array and the bottommost light shielding layer is set to be three times a spacing between adjacent optical sensing units of the optical fingerprint sensor, and a spherical radius of each of the plurality of micro-lenses is equal to the spacing between the adjacent optical sensing units, the thickness of the light path directing structure is less than 100 μm.

15. The electronic device according to claim 10, wherein a distance between the micro-lens array and the bottommost light shielding layer is set to be three times a spacing between adjacent optical sensing units in the optical fingerprint sensor, and a spherical radius of each of the plurality of micro-lenses is equal to the spacing between the adjacent optical sensing units, the thickness of the light path directing structure is less than 100 μm.

\* \* \* \* \*